US009415306B1

(12) United States Patent
Harrington et al.

(10) Patent No.: US 9,415,306 B1
(45) Date of Patent: Aug. 16, 2016

(54) CLIENTS COMMUNICATE INPUT TECHNIQUE TO SERVER (71) Applicant: KABAM, INC., San Francisco, CA (US)

(72) Inventors: Clifford J. Harrington, San Francisco, CA (US); Kent Wakeford, Hillsborough, CA (US)

(73) Assignee: KABAM, INC., San Francisco, CA (US)

( * ) Notice: Subject to any disclaimer, the term of this patent is extended or adjusted under 35 U.S.C. 154(b) by 65 days.

(21) Appl. No.: 13/965,056

(22) Filed: Aug. 12, 2013

(51) Int. Cl.
*A63F 9/24* (2006.01)
*A63F 13/30* (2014.01)
*A63F 13/23* (2014.01)

(52) U.S. Cl.
CPC .............. *A63F 13/12* (2013.01); *A63F 13/23* (2014.09); *A63F 2300/535* (2013.01); *A63F 2300/6054* (2013.01)

(58) Field of Classification Search
None
See application file for complete search history.

(56) References Cited

U.S. PATENT DOCUMENTS

| 5,838,907 | A | 11/1998 | Hansen | 395/200.5 |
|---|---|---|---|---|
| 6,425,822 | B1 * | 7/2002 | Hayashida | A63F 13/005 463/36 |
| 7,465,231 | B2 | 12/2008 | Lewin et al. | 463/37 |
| 7,890,586 | B1 | 2/2011 | McNamara | |
| 7,930,215 | B2 | 4/2011 | Pombo et al. | 705/26 |
| 7,997,987 | B2 | 8/2011 | Johnson et al. | 463/42 |
| 8,016,678 | B1 | 9/2011 | Hutter et al. | 463/42 |
| 8,209,277 | B2 | 6/2012 | Kumar et al. | 706/46 |
| 8,401,009 | B1 | 3/2013 | Dorsey et al. | 370/389 |
| 8,423,889 | B1 | 4/2013 | Zagrie et al. | 715/255 |
| 2002/0112081 | A1 | 8/2002 | Armstrong | |
| 2002/0132608 | A1 | 9/2002 | Shinohara | 455/412 |
| 2002/0138582 | A1 | 9/2002 | Chandra | |
| 2002/0158917 | A1 | 10/2002 | Sinclair et al. | 345/850 |
| 2003/0172121 | A1 | 9/2003 | Evans et al. | 709/206 |
| 2005/0261062 | A1 | 11/2005 | Lewin | |
| 2006/0015580 | A1 | 1/2006 | Gabriel et al. | 709/219 |
| 2006/0136964 | A1 * | 6/2006 | Diez et al. | 725/37 |
| 2007/0011256 | A1 | 1/2007 | Klein | |
| 2007/0219000 | A1 * | 9/2007 | Aida | G07F 17/32 463/42 |
| 2008/0090659 | A1 | 4/2008 | Aguilar | |
| 2008/0207327 | A1 | 8/2008 | Van Luchene | |

(Continued)

FOREIGN PATENT DOCUMENTS

WO WO 2006/013429 2/2006
WO WO 2008/157477 12/2008

(Continued)

*Primary Examiner* — Jason Yen
(74) *Attorney, Agent, or Firm* — Sheppard Mullin Richter & Hampton LLP (57) ABSTRACT

An online gaming system for presenting recommendations to users of an online game. The recommendations may be based on monitored usage of the individual interface methods and directed to use of a particular interface method and/or participation in content which is made available to the users. The system may comprise one or more processors configured to execute computer program modules. The system may include a client compatibility module configured to obtain interface methods available to the users; a game module configured to manage game content for portions of the online game which can be adjusted to make different content accessible to the users based on the interface methods available; an interface monitor module configured to monitor the usage of interface methods; and a recommendation module configured to present recommendations to the users related to the game content accessible by virtue of the available interface methods.

18 Claims, 3 Drawing Sheets

(56) References Cited

U.S. PATENT DOCUMENTS

| | | |
|---|---|---|
| 2008/0228636 A1 | 9/2008 | Gattis |
| 2009/0077463 A1 | 3/2009 | Koster ............... 715/234 |
| 2010/0245912 A1 | 9/2010 | Mount et al. ........... 358/1.15 |
| 2010/0248822 A1* | 9/2010 | Migos ............... A63F 13/06 463/29 |
| 2011/0022641 A1 | 1/2011 | Werth et al. ........... 707/803 |
| 2011/0082703 A1 | 4/2011 | Higbie ................ 705/1.1 |
| 2011/0118028 A1* | 5/2011 | Sobel ............... G06F 21/32 463/37 |
| 2011/0145050 A1 | 6/2011 | Gross |
| 2011/0179180 A1 | 7/2011 | Schleifer |
| 2011/0237335 A1 | 9/2011 | Holloway |
| 2011/0276883 A1 | 11/2011 | Cabble |
| 2012/0011211 A1 | 1/2012 | Smith |
| 2012/0038550 A1 | 2/2012 | Lemmey et al. ........... 345/156 |
| 2012/0192087 A1 | 7/2012 | Lemmey |
| 2012/0252582 A1* | 10/2012 | Hilleman ............... 463/43 |
| 2012/0277003 A1* | 11/2012 | Eliovits et al. ........... 463/42 |
| 2012/0311041 A1 | 12/2012 | Aonuma |
| 2012/0331058 A1 | 12/2012 | Huston et al. ........... 709/204 |
| 2013/0085886 A1 | 4/2013 | Satish et al. ........... 705/26.7 |
| 2013/0086467 A1 | 4/2013 | Weber et al. ........... 715/239 |
| 2013/0109480 A1 | 5/2013 | Yuan ................ 463/42 |
| 2013/0117105 A1 | 5/2013 | Dyor et al. ........... 705/14.52 |
| 2013/0117377 A1 | 5/2013 | Miller ................ 709/205 |
| 2013/0125113 A1 | 5/2013 | Do |
| 2013/0310156 A1 | 11/2013 | Gadher |
| 2014/0040760 A1 | 2/2014 | Randell |
| 2014/0310036 A1 | 10/2014 | Grosso |
| 2014/0324965 A1 | 10/2014 | Ralston |
| 2015/0011277 A1 | 1/2015 | Wakeford et al. ........... 463/1 |
| 2015/0120408 A1 | 4/2015 | Liu |

FOREIGN PATENT DOCUMENTS

| | | |
|---|---|---|
| WO | WO 2013/123122 | 8/2013 |
| WO | WO 2015/003069 | 1/2015 |

\* cited by examiner

CLIENTS COMMUNICATE INPUT TECHNIQUE TO SERVER

FIELD OF THE DISCLOSURE

This disclosure relates to systems and methods for making game content accessible to users of an online game through recommendations encouraging the users to participate in the online game using the one or more available interface methods.

BACKGROUND

Users of online games typically access the online games through user devices such as presentation control devices. Presentation control devices may include, for example, smartphones, cell phones, tablet computers, desktop computers, television set-top boxes, smart TV's, gaming consuls, and/or other device capable of accessing and facilitating presentation of game content related to an online game.

Presentation control devices may be configured with one or more interface methods which are available to the users while playing an online game. Interface methods may include any apparatus, features, and/or technique in which the users of the presentation control devices can interact with the online game. Interface methods can include, for example, touchscreens, handheld controllers (e.g., with buttons, joysticks, etc.), voice recognition (e.g., voice control), human gesture recognition (e.g., gesture control), and/or other methods. Interface method may be features which are integrated into the presentation control devices, and/or may be peripheral devices which are engaged to the presentation control devices during gameplay.

SUMMARY

One aspect of the disclosure relates to an online gaming system for presenting recommendations to users of an online game. The recommendations may be based on the interface methods available to the users at presentation control devices used to access the online game. The recommendations may correspond to the use of one of the many interface methods available for use during gameplay of the online game. The system may comprise one or more processors configured to execute computer program modules. The computer program modules may comprise one or more of a client compatibility module, game module, interface monitor module, recommendation module and/or other modules.

The client compatibility module may be configured to obtain interface methods which are available to the users at presentation control devices which are used to access an online game. The client compatibility module may obtain the available interface method in a variety of ways described in more detail herein.

The game module may be configured to execute an instance of the online game and to implement the instance of the online game to facilitate participation of users in the online game through presentation control devices. The game module may be configured to manage game content for portions of the online game which can be adjusted to make different content accessible to the users based on the interface methods available to the users of the online game. The game module may be configured such that by virtue of the client compatibility module obtaining a first interface method and a second interface method available to a first user of a first presentation control device, a first game content for a first portion of the online game is made accessible to the first user. The first game content of the first portion may be made accessible to the user based on the first interface method and the second interface method being available at the first presentation control device.

The interface monitor module may be configured to monitor the usage of interface methods used by the users during gameplay of the online game. Monitoring performed by the interface monitor module may indicate that one or more interface methods are underused compared to others.

The recommendation module may be configured to present recommendations to the users of the online game related to the content accessible by the users by virtue of the interface methods available to the users. The recommendation module may be configured such that the presentations may be based on the monitoring performed by the interface monitor module. The recommendation module may be configured such that responsive to the monitoring of the first user indicating underuse of the first interface method, the recommendation module is configured to present a first recommendation to the first user corresponding to use of the first interface method to encourage the first user to participate in the first game content of the first portion of the online game using the first interface method.

Another aspect of the disclosure relates to a method for communicating recommendations to users of an online game based on the interface methods available to the users at presentation control devices used to access the online game. The method may be implemented in a computer system that includes one or more physical processors and storage media storing machine-readable instructions. The method may comprise the steps of: obtaining interface methods available to the users at the presentation control devices which are used to access an online game; executing an instance of the online game and to implement the instance of the online game to facilitate participation of users in the online game on presentation control devices; managing game content for portions of the online game which can be adjusted to make different content accessible to the users based on the interface methods available to the users of the online game; monitoring the usage of interface methods used by the users during gameplay of the online game; presenting recommendations to the users of the online game related to the content accessible by the users by virtue of the interface methods available to the users; and/or other operations.

Managing game content to make content accessible may include, for example, by virtue of obtaining a first interface method and a second interface method available to a first user of a first presentation control device, a first game content for a first portion of the online game is made accessible to the first user. The first game content of the first portion may be made accessible based on the first interface method and the second interface method being available to the first user at the first presentation control device.

Presenting recommendations may include, for example, presentations being made based on the monitoring of the usage of interface methods, including responsive to the monitoring of the first user indicating underuse of the first interface method, presenting a first recommendation to the first user corresponding to use of the first interface method to encourage the first user to participate in the first game content of the first portion of the online game using the first interface method.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
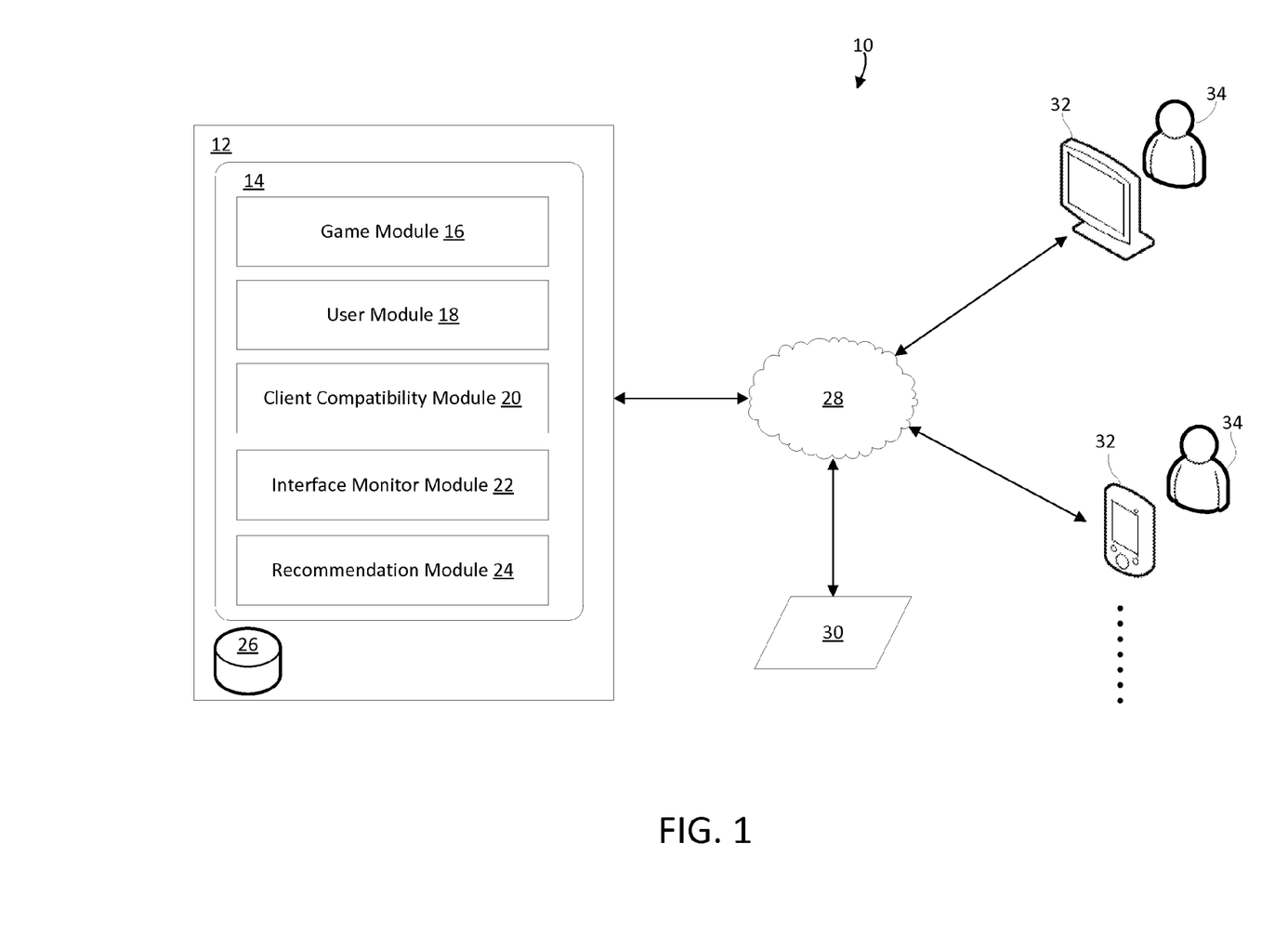
FIG. 1 illustrates a system for presenting recommendations to users of an online game.

FIG. 1 illustrates a system 10 for presenting recommendations to users 34 of an online game. The presented recommendations may correspond to the use of a given interface method available to the users at presentation control devices 32 used to access the online game. The presentation control devices 32 may be configured with one or more available interface methods for use therewith. The recommendations may encourage the users to participate in one or more portions of the online game using a given interface method.

The system 10 may be configured such that game content is made accessible by virtue of the interface method available for use by the users 34 at the presentation control devices 32. The recommendations may include one or more of a recommendation to use a given interface method, a recommendation to participate in portions of game content which are made accessible by virtue of the available interface methods, and/or other recommendations. The recommendations may be based, at least in part, on the past usage of the various available interface methods by the users 34 when playing the online game and/or other online games, and/or other considerations.

Presentation control devices 32 may include, for example, a smartphone, a cell phone, tablet computer, desktop computer, a television set-top box, smart TV, gaming consul, and/or other device capable of facilitating the various aspects of the system 10 described herein. The presentation control devices 32 may include one or more interface methods which are available for use with the given presentation control device 32. For example, a smartphone may include interface methods such as a touchscreen, voice recognition, one or more physical interface elements (e.g., buttons), and/or other interface methods. A smart TV may include interface methods such as human gesture recognition (e.g., facilitated by a motion capture system), handheld controllers, voice recognition, and/or other interface methods. Users 34 may be able to play the online game through various different presentation control devices 32, such that the interface methods available for use may vary depending on the presentation control device 32 the users 34 employ to play the online game. The examples described herein are purely illustrative and are not intended to be limiting. The various presentation control devices 32 and interface method available thereon may be described in other ways, and/or may include other interface methods, components, and/or features.

Interface methods which are available for use at the presentation control devices 32 may provide different levels of user control and/or interaction while playing the online game. For example, human gesture recognition interface method, by virtue of the capabilities of the interface and/or configuration of the online game, may allow users 34 to control and/or interact with portions of the online game in some limited manner, while a touchscreen interface method, by virtue of the capabilities of the touchscreen interface and/or configuration of the online game, may allow users 34 to control and/or interact with portions of the online game in a richer manner (e.g,. more interaction). Therefore, some interface methods may allow for more user control and/or interaction capabilities then others. The examples described herein are purely illustrative and are not intended to be limiting. The various levels of interaction and/or control provided by the interface methods may be described in other ways, and/or may include other interaction capabilities and/or control features. Various examples of interface methods and levels of user control within different portions of the online game are describe further herein.

Portions of game content may refer to one or more of a particular feature, event, task, mission, level, and/or scene related to gameplay of the online game. For example, a feature may include a virtual shop feature in the online game, and/or other feature. The virtual shop may include content such as a shop interface which presents virtual items available for purchase by the users 34 using currency (virtual or real), purchasing capabilities, interaction with a virtual teller, and/or other content. A user 34 employing a handheld controller as an interface method may be able to interact with the content of the virtual shop in a manner which allows the user to browse the items, select items, interact with the virtual teller, and purchase items. A user 34 employing gesture recognition as an interface method may be provided less user control and/or interaction (or possible more user 34 control depending on the configuration of the online game) such that the user 34 may not be able to interact with the virtual teller by virtue of the use of the gesture recognition type interface method and/or configuration of the online game. Again, these and other examples described herein are purely illustrative and are not intended to be limiting.

An event portion of the online game may refer to, for example, a meeting of an alliance of players in the online game, and/or other type of event within the online game. An alliance of players may be a team and/or group of users 34 of the online game who work together to complete game objectives, missions, and/or other tasks. A meeting may include content such as a discussion board for use by the users 34 in the alliance. The discussion board may provide communication capabilities in a player-to-player manner, and/or group conversations. For example, a discussion may be on strategy for completing an upcoming mission using player-to-player or group communications capabilities (e.g., a textual chat or messaging board) provided by the online game. A user 34 employing a handheld controller interface method may be able to interact with content of the discussion board in ways such as, viewing messages input by other users 34, providing their own input (e.g., by selecting alphanumeric characters from a presented list of characters for input into a textual chat window), and/or other content interactions. A user 34 employing human voice control may be also be able to interact with the discussion board content in a similar manner including viewing messages of other, and providing their own input (e.g., via voice-to-text processing). However, a user 34 of touchscreen may be able to interact with the discussion board content in a more limited manner than those employing a handheld controller and/or voice control, in that the user 34 of a touchscreen may be limited to only viewing messages from others, and may not be able to provide input by virtue of the capabilities of the touchscreen and/or configuration of the online game (e.g., cannot select alphanumeric characters for input into the messaging window).

A task portion of the online game may refer to any in-game task which is separate from the game objectives. A task may include, for example, collecting certain virtual items, obtaining a status, communication with other players and/or virtual characters/object in the game, destroying an enemy base, and/or other task. Some interface methods may provide a more rich form of interaction with in-game tasks content than with other interface methods, by virtue of the capabilities of the interface methods and/or configuration of the online game.

A level portion of the online game may refer to the completion of a game objective (e.g., an objective being beat the levels of the game). The content of the game levels may be include interactions with virtual objects (e.g., buildings) and/or characters, acceptable commands the user 34 can input to perform maneuvers/actions, and/or other content. A mission may refer to the completion of collections of levels and/or tasks, and/or other considerations. Some interface methods may provide a more rich form of interaction with the content provided in the levels (e.g., the user 34 can input a large variety of commands to perform actions, e.g., send guided missile strikes) than with other interface methods (e.g., the user 34 may be limited in the commands which they can input during gameplay, e.g., send non-guided missile strikes), by virtue of the capabilities of the interface methods and/or the configuration of the online game. Other considerations for game portions are also contemplated in this disclosure.

In FIG. 1, providing the virtual environment may include hosting the virtual environment over a network 28, such as the Internet. A host server may include one or more processors configured to execute one or more computer modules for implementing an instance of an online game and to facilitate the participation of one or more users in the online game. The host server may be a game server 12.

The computer program modules may include one or more of a game module 16, a user module 18, a client compatibility module 20, interface monitor module 22, recommendation module 24, and/or other modules. The server 12 may be configured to communicate with one or more presentation control devices 32, according to client/server architecture. The presentation control devices 32 can include, for example, a cellular telephone, a smartphone, a laptop, a tablet computer, a desktop computer, a television set-top box, smart TV, a gaming consul, and/or other device. The users may access system 10 and/or the virtual environment via the presentation control devices 32.

The game module 16 may be configured to implement an instance of the virtual environment executed by the computer modules to determine state of the virtual environment. The state may then be communicated (e.g., via streaming visual data, via object/position data, and/or other state information) from server 12 to presentation control devices 32 for presentation to users. The state determined and transmitted to a given presentation control device 32 may correspond to a view for a user character being controlled by a user via input devices (e.g., a controller) at the given presentation control device 32. The state determined and presented to a given presentation control device 32 may correspond to a location in the virtual environment (e.g., location in the game). The view described by the state for the given presentation control device 32 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual environment may comprise a simulated environment that is accessible by users via clients (e.g., presentation control devices 32) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). An instance executed by the computer modules may be synchronous, asynchronous, and/or semi-synchronous.

The above description of the manner in which state of the virtual environments is determined by game module 16 is not intended to be limiting. The game module 16 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 16, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through interface method available at the presentation control devices 32. The users may interact with each other through communications exchanged within the virtual environment. Such communications may include one or more of textual chat, instant messages, private messages, voice communications, and/or other communications. Communications may be received and entered by the users via their respective presentation control devices 32. Communications may be routed to and from the appropriate users through server 12 (e.g., through game module 16).

The game module 16 may be configured to manage game content for portions of the online game. The content for the portions of the online game may be adjusted to make different content accessible to the users 34 based on the interface methods available to the users 34. In some implementations, the game content made accessible may be content which is in accordance with the control and/or interact-ability with the online game provided by the available interface methods. In some implementations, the game content made accessible may be content which is in accordance with the configuration of the online game itself (e.g., limitations in game content for certain interface methods by design and not necessarily due to the limitations of the interface methods themselves).

Figure 2:
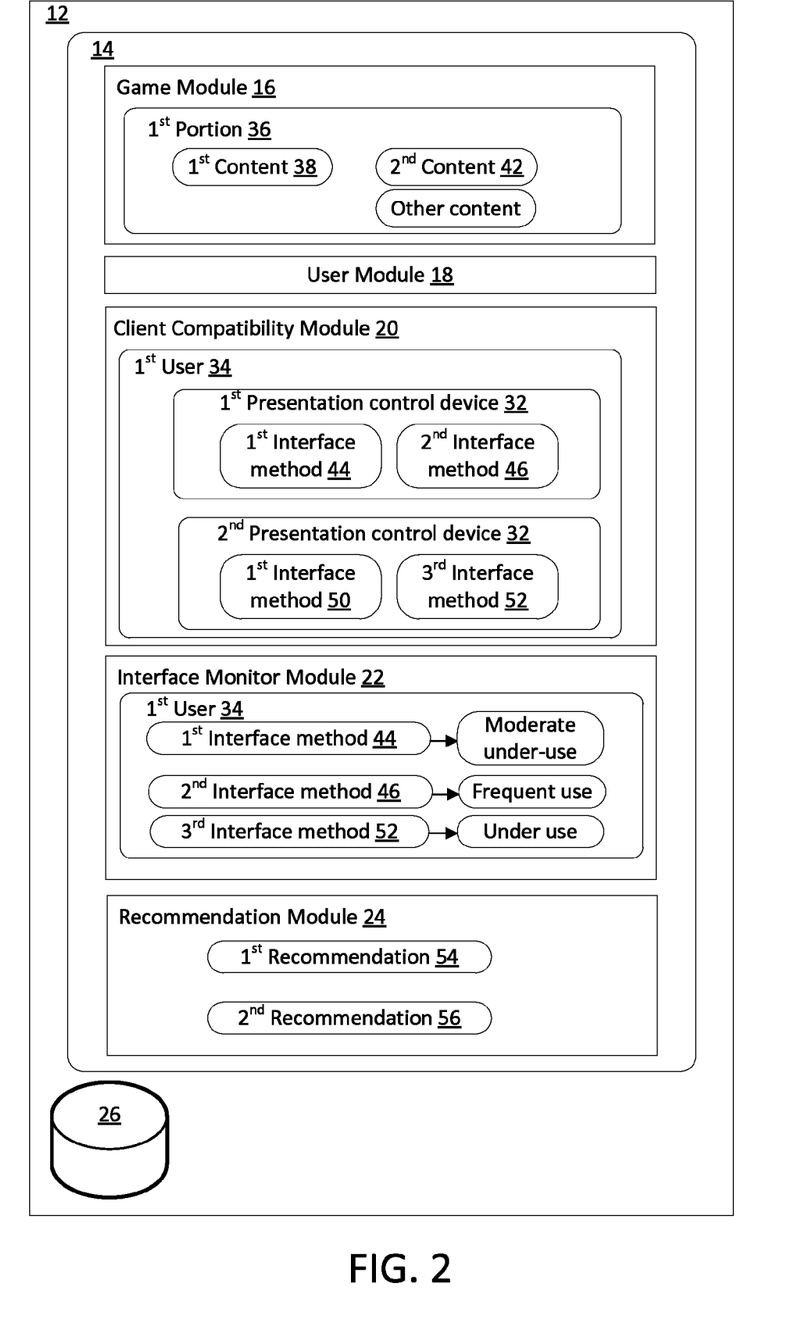
FIG. 2 illustrates in more detail a server employed with the system of FIG. 1.

As an illustrative example, in FIG. 2, the game module 16 may be configured such that by virtue of the client compatibility module 20 obtaining a first interface method 44 and a second interface method 46 available to a first user 34 of a first presentation control device 32, first game content 38 for a first portion 36 of the online game is made accessible to the first user 34. The first game content 38 of the first portion 36 may be made accessible based on the first interface method 44 and the second interface method 46 being available to the first user 34 at the first presentation control device 32. The first game content 38 may be content which is in accordance with the control and/or interact-ability with the online game corresponding to the first interface method 44 and the second interface method 46 at the first presentation control devices 32.

For example, in some implementations the first interface method 44 may be a handheld controller, the second interface method 46 may comprise human gesture recognition, the first portion 36 may be a virtual shop, and the first game content 38 may include content which allows the user to browse the items, select items, interact with the virtual teller, and purchase items. The first interface method 44 may provide a first level of user control of the online game (e.g., in the first portion 36) and the second interface method 46 may provide a second level of user control of the online game (e.g., the first portion 36), such that the first game content 38 of the first portion 36 includes content corresponding to the first level of control and content corresponding to the second level of control (e.g., although use of the human gesture recognition may not allow the user 34 to interact with the teller as described above, the ability to interact with the teller is still made accessible to the user 34 by virtue of the handheld controller also being an available interface method which facilities interaction with this feature). Therefore, use of the first interface method 44 by the first user 34 during the first portion 36 of the online game, may provide enhanced game content interaction compared to use of the second interface method 46 by the first user 34 during the first portion 38 of the online game.

In some implementations, the game module 16 may be configured such that, by virtue of the client compatibility module 20 obtaining a first interface method 44 and a third interface method 52 available to the first user 34 when using a second presentation control device 32 different than the first, the game content for the first portion 36 may be adjusted such that second game content 42 for the first portion 36 is made accessible to the first user 34. The second game content 42 of the first portion 36 may be made accessible based on the first interface method 44 and the third interface method 52 being available to the first user 34 at the second presentation control device 32. The second game content 42 may include content which is different than the first game content 38 by virtue of the availability of the first interface method 44 and third interface method 52.

Returning to FIG. 1, the user module 18 may be configured to access and/or manage one or more user profiles and/or user information associated with users of the system 10. The one or more user profiles and/or user information may include information stored by server 12, one or more of the presentation control devices 32, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The user module 18 may be configured to manage the user's "inventory" of virtual items and/or currency that the users can use within the virtual space. A user may have a game "inventory" of one or more virtual items and/or currency that the user can use (e.g., by manipulation of one or more user characters or other user controlled element, and/or other items) to perform in-game actions within the virtual space. The inventory can be determined on a game-to-game basis for one or more games available within the virtual space, or for one or more games in one or more other virtual spaces. The inventory may encompass multiple inventories of virtual items across multiple games played by the user 34.

The client compatibility module 20 may be configured to obtain interface methods available to the users at presentation control devices 32 which are used to access the online game. The client compatibility module 20 may obtain the available interface methods in a variety of ways. The client compatibility module 20 may obtain the interface method available at the presentation control devices 32 by communicating with the presentation control devices 32 (e.g., via network 28). The client compatibility module 20 may obtain the interface method available at the presentation control devices 32 by receiving user 34 inputs indicating the available interface method at the presentation control devices 32. The client compatibility module 20 may obtain the available interface method by other techniques.

The client compatibility module 20 may obtain the interface method available at the presentation control devices 32 by communicating with the presentation control devices 32 (e.g., via network 28) such that the client compatibility module 20 retrieves and/or receives the available interface methods from the presentation control devices 32. By virtue of the interface method available for use at the presentation control devices 32, the presentation control devices 32 may send to the server 12 (e.g., client compatibility module 20) information containing a list or listing of the available interface method corresponding to a given presentation control device 32, and/or communication other information which indicates of the available interface methods. The server 12 (e.g., client compatibility module 20) may retrieve the list or listing of the available interface method for a given presentation control device 32 from the presentation control devices 32. For example, the system 10 may query the presentation control devices 32 to obtain the availability of interface methods, and then the presentation control devices 32 may allow retrieval of a list of the available interface methods by the client compatibility module 20.

The client compatibility module 20 may obtain the interface method available at the presentation control devices 32 by receiving user 34 inputs such that prior to or during gameplay, the user 34 selects (e.g., from a list, pop up window, etc.) the interface method available to the user 34 at the presentation control device 32. The selection comprising information to indicate the available interface methods at the presentation control devices 32 may be sent from the presentation control devices 32 to the server 12 (e.g., client compatibility module 20), for example, via network 28.

The interface monitor module 22 may be configured to monitor the usage of interface methods used by the users 34 during gameplay of the online game. Monitoring usage may include monitoring historical usage of the interface methods by the user 34 during gameplay of the online game and/or one or more different online games. Monitoring usage may include monitoring historical usage of the interface methods by the user 34 during gameplay of particular portions of the online game and/or portions of one or more different online games. The monitoring performed by the interface monitor module 22 may be used to indicate a usage parameter for the individual interface methods. For example, usage parameters may include qualitative parameters such as "Frequently Used", "Moderately Used", "Under Used", "Not Used", and/or other qualitative description. Usage parameters may include quantitative parameters. Quantitative parameters may include a scale of parameters, numerical rating system, and/or other quantitative description technique. For example, a whole digit scale from 0 to 10 may be used, wherein 0 indicates generally an interface method which is "Not Used", and 10 indicates generally an interface method which is "Frequently Used". The examples described herein are purely illustrative and are not intended to be limiting. The various descriptions of interface method usage may be described in other ways.

The recommendation module 24 may be configured to present recommendations to the users of the online game related to the content accessible to the users 34 by virtue of the interface methods available to the users 34 at the presentation control devices 32. The presentation of recommendations may be made based on the monitoring performed by the interface monitor module 22. The recommendations may correspond to use of a given interface method to encourage the users 34 to participate in the online game using the given interface method. The given interface methods associated with the recommendations may be interface methods which are indicated (e.g., by interface monitor module 22) as being under-used interface methods compared to other interface methods available to the users 34. The indication of usage may be based on gameplay of the online game as a whole, gameplay during certain portions of the online game, and/or other considerations. The recommendations may be directed toward use of an interface method, toward participation in game content made accessible to the users 34 by virtue of the available interface methods, and/or other recommendation.

By way of illustration, in FIG. 2 the recommendation module 24 may be configured such that responsive to the monitoring performed by the interface monitor module 22 of the first user 34 indicating underuse of the first interface method 44 compared to the second interface method 46 corresponding to the first presentation control device 32, the recommendation module 24 may be configured to present a first recommendation 54 to the first user 32 corresponding to use of the first interface method 44 to encourage the first user 32 to participate in the first game content 38 of the first portion 36 of the online game using the first interface method 44. The first recommendation 54 may be a recommendation to use the first interface method 44, for example, the first recommendation 54 may be "You are about to enter the virtual shop, we recommend you switch to the handheld controller!" In some implementations, the first recommendations 54 may be a recommendation directed to participating in the first game content 38 of the first portion 36, for example, "You are about to enter the virtual shop, we recommend you speak with the shop teller about the items for sale, to do so, switch to the handheld controller". The examples described herein are purely illustrative and are not intended to be limiting. The recommendations may be described in other ways, and/or may be directed toward other features and/or content of the online game.

The recommendation module 24 may be further configured, such that responsive to the monitoring by the interface monitor module 22 of the first user 34 indicating underuse of the third interface method 52 compared to the first interface method 44 corresponding to use of the second presentation control device 32 to access the online game, to present a second recommendation 56 to the first user 32 corresponding to use of the third interface method 52 to encourage the first user 34 to participate in the second game content 42 of the first portion 36 of the online game using the third interface method 52.

Returning to FIG. 1, the server 12, presentation control devices 32, and/or external resources 30 may be operatively linked via one or more electronic communication links. For example, such electronic communication links may be established, at least in part, via a network 28 such as the Internet and/or other networks. It will be appreciated that this is not intended to be limiting, and that the scope of this disclosure includes implementations in which servers 12, presentation control devices 32, and/or external resources 30 may be operatively linked via some other communication media.

The external resources 30 may include sources of information, hosts and/or providers of virtual environments outside of system 10, external entities participating with system 10, external entities for player-to-player communications, and/or other resources. In some implementations, some or all of the functionality attributed herein to external resources 30 may be provided by resources included in system 10.

The server 12 may include electronic storage 26, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 26 may comprise electronic storage media that electronically stores information. The electronic storage media of electronic storage 26 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 26 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 26 may include one or more virtual storage resources (e.g., cloud storage, a virtual private network, and/or other virtual storage resources). Electronic storage 26 may store software algorithms, information determined by processor 14, information received from server 12, information received from presentation control devices 32, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24. Processor 14 may be configured to execute modules 16, 18, 20, 22, 24 by software; hardware; firmware; some combination of software, hardware, and/or firmware; and/or other mechanisms for configuring processing capabilities on processor 14.

It should be appreciated that although modules 16, 18, 20, 22, 24 are illustrated in FIG. 1 as being co-located within a single processing unit, in implementations in which processor 14 includes multiple processing units, one or more of modules 16, 18, 20, 22, 24 may be located remotely from the other modules. The description of the functionality provided by the different modules 16, 18, 20, 22, 24 described above is for illustrative purposes, and is not intended to be limiting, as any of modules 16, 18, 20, 22, 24 may provide more or less functionality than is described. For example, one or more of modules 16, 18, 20, 22, 24 may be eliminated, and some or all of its functionality may be provided by other ones of modules 16, 18, 20, 22, and/or 24, and/or other modules. As another example, processor 14 may be configured to execute one or more additional modules that may perform some or all of the functionality attributed below to one of modules 16, 18, 20, 22, 24.

Figure 3:
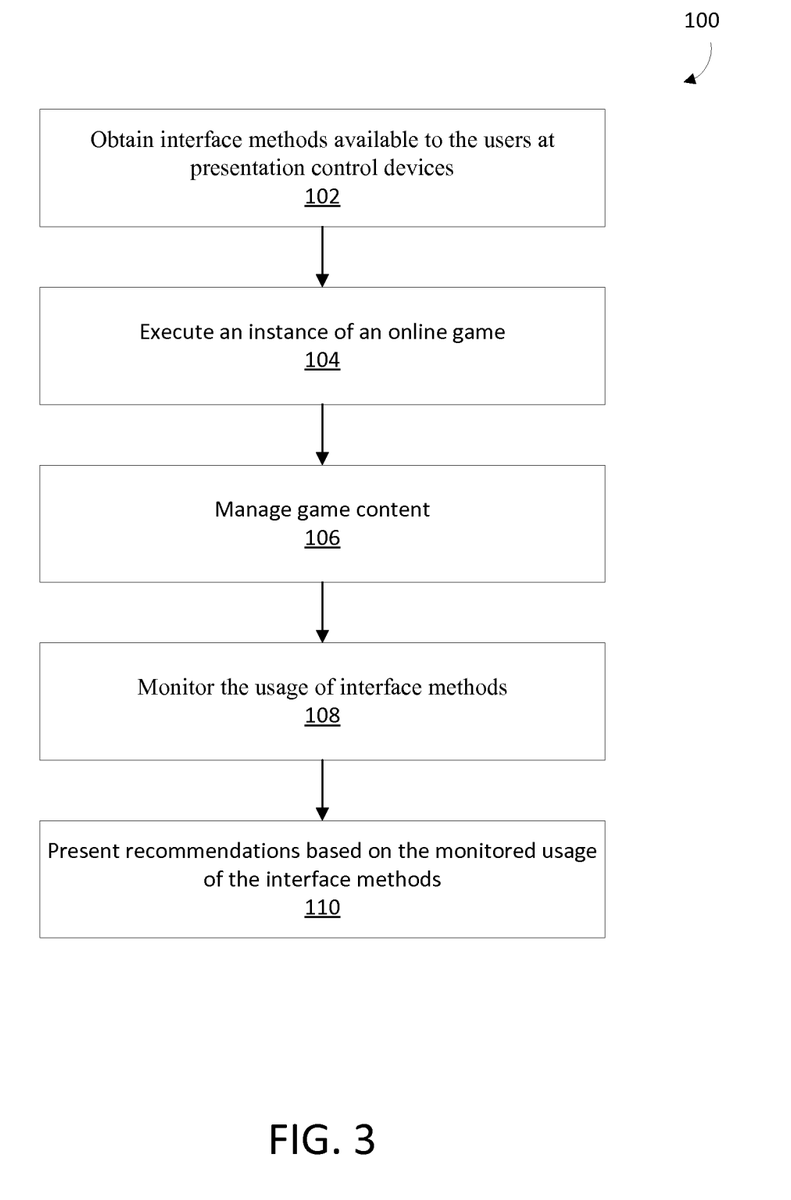
FIG. 3 illustrates a method for presenting recommendations to users of an online game.

FIG. 3 illustrates method 100 for hosting a virtual environment to presentation control devices 32 for presenting recommendations to the users 34 of the presentation control devices 32 corresponding to the use of interface method available at the presentation control devices 32. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at the interface method available to users 34 at presentation control devices 32 are obtained. In some implementations, operation 102 may be performed by a client compatibility module the same as or similar to client compatibility module 20 (shown in FIG. 1 and described herein).

At an operation 104, an instance of an online game is executed. The instance of the online game may be implemented to facilitate participation of users in the online game on presentation control devices. In some implementations, operation 104 may be performed by a game module the same as or similar to the game module 16 (shown in FIG. 1 and described herein).

At an operation 106, managing of game content for portions of the online game which can be adjusted to make different content accessible to the users are based on the interface methods available to the users of the online game is performed. Managing the content may include, for example, by virtue of obtaining a first interface method and a second interface method available to a first user of a first presentation control device, a first game content for a first portion of the online game may be made accessible to the first user 34. In some implementations, operation 106 may be performed by a game module the same as or similar to game module 16 (shown in FIG. 1 and described herein).

At an operation 108, the usage of interface methods used by the users during gameplay of the online game is monitored. In some implementations, operation 108 may be performed by an interface monitor module the same as or similar to interface monitor module 22 (shown in FIG. 1 and described herein).

At an operation 110, a recommendation is presented to the user of the online game. The recommendation may be related to the content accessible by the users by virtue of the interface methods available to the users. The presentations of recommendations may be made based on the monitoring of the usage of interface methods. For example, responsive to the monitoring of a first user indicating underuse of the first interface method, presenting a first recommendation to the first user corresponding to use of the first interface method to encourage the first user to participate in the first game content of the first portion of the online game using the first interface method. In some implementations, operation 110 may be performed by a recommendation module the same as or similar to recommendation module 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system for presenting recommendations to users of an online game based on the interface methods available to the users at presentation control devices, the system comprising:
   one or more processors configured by machine-readable instructions to:
      obtain interface methods available to the users at presentation control devices which are used to access an online game;
      execute an instance of the online game, to implement the instance of the online game to facilitate participation of users in the online game on presentation control devices, and to manage game content for portions of the online game which can be adjusted to make different content accessible to the users based on the interface methods available to the users of the online game, wherein by virtue of obtaining a first interface method and a second interface method available to a first user of a first presentation control device, a first game content for a first portion of the online game is made accessible to the first user, the first game content of the first portion being accessible based on the first interface method and the second interface method being available to the first user at the first presentation control device;
      monitor the usage of interface methods used by the users during gameplay of the online game;
      a present recommendations to the users of the online game related to the content accessible by the users by virtue of the interface methods available to the users, such presentations being made based on the monitoring, such that responsive to the monitoring of the first user indicating underuse of the first interface method, a first recommendation is presented to the first user corresponding to use of the first interface method to encourage the first user to participate in the first game content of the first portion of the online game using the first interface method.

2. The system of claim 1 wherein the one or more processors are further configured by machine-readable instructions such that the first recommendation is a recommendation to use the first interface method.

3. The system of claim 1 wherein the one or more processors are further configured by machine-readable instructions such that the first recommendation is a recommendation to participate in the first game content of the first portion.

4. The system of claim 1 wherein the one or more processors are further configured by machine-readable instructions such that the interface methods accessible to the users at the presentation control devices provide different levels of user control of the online game, such that first interface method provides a first level of user control of the online game and the second interface method provides a second level of user control of the online game, such that the first game content of the first portion includes content corresponding to the first level of control and content corresponding to the second level of control.

5. The system of claim 4 wherein the one or more processors are further configured by machine-readable instructions such that the first level of user control provided by the first interface method comprises more control of the online game than the second level of user control provided by the second interface method, such that use of the first interface method by the first user during the first portion of the online game, provides enhanced game content interaction compared to use of the second interface method by the first user during the first portion of the online game.

6. The system of claim 5 wherein the one or more processors are further configured by machine-readable instructions such that the first interface method comprises a handheld controller and the second interface method comprises human gesture recognition.

7. The system of claim 5 wherein the one or more processors are further configured by machine-readable instructions such that the first interface method comprises a handheld controller and the second interface method comprises a touchscreen.

8. The system of claim 5 wherein the one or more processors are further configured by machine-readable instructions such that the first interface method comprises a touchscreen and the second interface method comprises human gesture recognition.

9. The system of claim 1 wherein the one or more processors are further configured by machine-readable instructions such that:
   by virtue of obtaining a first interface method and a third interface method available to the first user of a second presentation control device, a second game content for the first portion is made accessible to the first user, the second game content of the first portion being accessible based on the first interface method and the third interface method being available to the first user at the second presentation control device; and
   responsive to the monitoring of the first user indicating underuse of the third interface method, a second recommendation is presented to the first user corresponding to use of the third interface method to encourage the first user to participate in the second game content of the first portion of the online game using the third interface method.

10. A method for communicating recommendations to the users of an online game based on the interface methods available to the users at presentation control devices, the method being implemented in a computer system that includes one or more physical processors and storage media storing machine-readable instructions, the method comprising:
   obtaining interface methods available to the users at presentation control devices which are used to access an online game;
   executing an instance of the online game, to implement the instance of the online game to facilitate participation of users in the online game on presentation control devices;
   managing game content for portions of the online game which can be adjusted to make different content accessible to the users based on the interface methods available to the users of the online game, including by virtue of obtaining a first interface method and a second interface method available to a first user of a first presentation control device, a first game content for a first portion of the online game is made accessible to the first user, the first game content of the first portion being accessible based on the first interface method and the second interface method being available to the first user at the first presentation control device;
   monitoring the usage of interface methods used by the users during gameplay of the online game; and
   presenting recommendations to the users of the online game related to the content accessible by the users by virtue of the interface methods available to the users, such presentations being made based on the monitoring of the usage of interface methods, including responsive to the monitoring of the first user indicating underuse of the first interface method, presenting a first recommendation to the first user corresponding to use of the first interface method to encourage the first user to participate in the first game content of the first portion of the online game using the first interface method.

11. The method of claim 10 wherein the first recommendation is a recommendation to use the first interface method.

12. The method of claim 10 wherein the first recommendation is a recommendation to participate in the first game content of the first portion.

13. The method of claim 10 wherein the interface methods accessible to the users at the presentation control devices provide different levels of user control of the online game, such that first interface method provides a first level of user control of the online game and the second interface method provides a second level of user control of the online game, such that the first game content of the first portion includes content corresponding to the first level of control and content corresponding to the second level of control.

14. The method of claim 13 wherein the first level of user control provided by the first interface method comprises more control of the online game than the second level of user control provided by the second interface method, such that use of the first interface method by the first user during the first portion of the online game, provides enhanced game content interaction compared to use of the second interface method by the first user during the first portion of the online game.

15. The method of claim 14 wherein the first interface method comprises a handheld controller and the second interface method comprises human gesture recognition.

16. The method of claim 14 wherein the first interface method comprises a handheld controller and the second interface method comprises a touchscreen.

17. The method of claim 14 wherein the first interface method comprises a touchscreen and the second interface method comprises human gesture recognition.

18. The method of claim 10 additionally comprising:

by virtue of obtaining a first interface method and a third interface method available to the first user of a second presentation control device, managing game content to make a second game content for the first portion accessible to the first user, the second game content of the first portion being accessible based on the first interface method and the third interface method being available to the first user at the second presentation control device; and responsive to the monitoring of the first user indicating underuse of the third interface method, presenting a second recommendation to the first user corresponding to use of the third interface method to encourage the first user to participate in the second game content of the first portion of the online game using the third interface method.

* * * * *